United States Patent [19]

Hull, Jr. et al.

[11] Patent Number: 5,024,069
[45] Date of Patent: Jun. 18, 1991

[54] ANTI-THEFT LOCKING APPARATUS FOR STEERING WHEELS

[76] Inventors: Edwin J. Hull, Jr., 1652 Sheridan Rd., South Euclid, Ohio 44121; Charles R. Johnson, 55 S. Chillicothe, Aurora, Ohio 44202

[21] Appl. No.: 568,216
[22] Filed: Aug. 16, 1990
[51] Int. Cl.$^5$ ............................................. B60R 25/02
[52] U.S. Cl. ...................................... 70/209; 70/226; 70/238
[58] Field of Search ................... 70/209–212, 70/215, 225, 226, 238, 252, 19, 57, 58

[56] References Cited

U.S. PATENT DOCUMENTS

| 289,491 | 4/1987 | Johnson | D8/330 |
|---|---|---|---|
| 1,193,679 | 8/1916 | Fox | 70/211 X |
| 1,429,334 | 9/1922 | Furber | 70/209 |
| 3,462,982 | 8/1969 | Moore | 70/209 |
| 3,828,593 | 8/1974 | Bolton | 70/209 |
| 4,103,524 | 8/1978 | Mitchell et al. | 70/209 |
| 4,304,110 | 12/1981 | Fain | 70/209 |
| 4,444,030 | 4/1984 | Dausch | 70/209 |
| 4,699,238 | 10/1987 | Tamir | 180/287 |
| 4,738,127 | 4/1988 | Johnson | 70/209 |
| 4,747,279 | 5/1988 | Solow | 70/238 |
| 4,750,341 | 6/1988 | Laguna | 70/209 |
| 4,779,435 | 10/1988 | Farrow | 70/238 |
| 4,823,573 | 4/1989 | Latta | 70/209 |
| 4,829,797 | 5/1989 | Wu | 70/209 |
| 4,881,386 | 11/1989 | Glines | 70/19 |
| 4,882,920 | 11/1989 | Wu | 70/226 X |

FOREIGN PATENT DOCUMENTS

| 631708 | 6/1936 | Fed. Rep. of Germany | 70/209 |
|---|---|---|---|
| 807760 | 7/1951 | Fed. Rep. of Germany | 70/238 |
| 2605831 | 8/1977 | Fed. Rep. of Germany | 70/19 |
| 470570 | 5/1969 | Switzerland | 70/19 |
| 152025 | 1/1922 | United Kingdom | 70/211 |
| 2037680 | 7/1980 | United Kingdom | 70/212 |

Primary Examiner—Robert L. Wolfe
Assistant Examiner—Suzanne L. Dino
Attorney, Agent, or Firm—Tilton, Fallon, Lungmus & Chestnut

[57] ABSTRACT

A lock apparatus for locking the steering wheel of a vehicle includes an elongate member, a pair of hook members fixedly secured to one end of the elongate member, and a lock assembly pivotally mounted on the elongate member. The lock assembly pivots to a locking position where it cooperates with the hook members to secure the steering wheel of a vehicle between it and the hook members and away from the locking position to release the steering wheel. The opposite end of the elongate member engages the seat, door panel or other portion of the passenger compartment of a vehicle proximate the steering wheel.

9 Claims, 1 Drawing Sheet

ANTI-THEFT LOCKING APPARATUS FOR STEERING WHEELS

BACKGROUND OF THE INVENTION

1. Field Of The Invention

The present invention relates to an anti-theft apparatus for automobiles and other vehicles, and more particularly to a lock apparatus which secures the steering wheel of a vehicle and limits rotation of the wheel.

2. Description Of The Prior Art

The prior art includes a wide variety of anti-theft devices which lock the various controls of an automobile, including steering wheel, gas and brake pedal, and gear select lever locking devices. These prior devices are complex, and they include a multiplicity of components. They require costly materials and costly manufacture and assembly processes.

Unlike the prior securing devices, the locking device of the present invention is of simple construction. It allows a user to quickly and effectively lock the steering wheel of a vehicle and limit rotation of the wheel. It includes a small number of components (none of which are detachable) which minimize the expense of manufacture and assembly and provide an effective lock.

SUMMARY OF THE INVENTION

In accordance with this invention, a lock apparatus includes an elongate member, hook means fixedly secured to the elongate member, and a locking assembly pivotally mounted on the elongate member. The hook means cooperates with the locking assembly to secure the elongate member to the steering wheel of a vehicle. Secured to the steering wheel, the elongate member acts as a stop, engaging those portions of the passenger compartment proximate the steering wheel and limiting the rotation of the wheel.

The locking assembly lies pivotally mounted on the elongate member, movable to a first, locking position where it cooperates with the hook means and away from this first, locking position to release the steering wheel. It includes a conventional bolt lock with a bolt or pin which extends into an opening in the elongate member, when the locking assembly lies in the first position, to prevent pivoting of the assembly.

A stop limits the rotational movement of the locking assembly between the first position and a second predetermined position. Thus, it allows a user to quickly find the locking position. It also limits axial movement of the locking assembly.

BRIEF DESCRIPTION OF THE DRAWINGS

For a more complete understanding of this invention, one should now refer to the embodiment illustrated in greater detail in the accompanying drawings and described below by way of an example of the invention. In the drawings.

While the following disclosure describes the invention in connection with one embodiment, one should understand that the invention is not limited to this embodiment. Furthermore, one should understand that the drawings are not to scale and that graphic symbols, diagrammatic representations or fragmentary views may, in part, illustrate the embodiment. In certain instances, the disclosure may not include details which are not necessary for an understanding of the present invention.

DETAILED DESCRIPTION OF THE DRAWINGS AND AN EMBODIMENT

Figure 1:
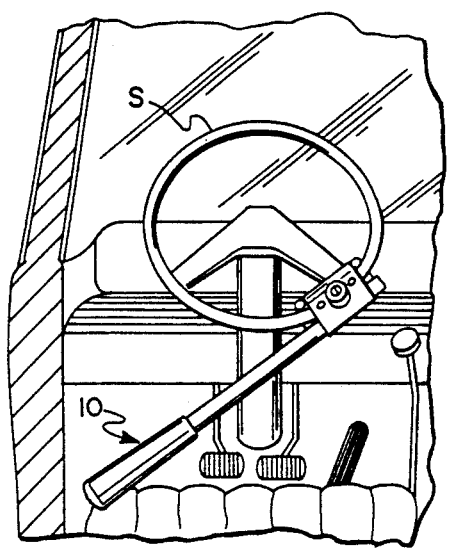
FIG. 1 is a perspective view of the lock apparatus secured to the steering wheel of an automobile.
Figure 2:
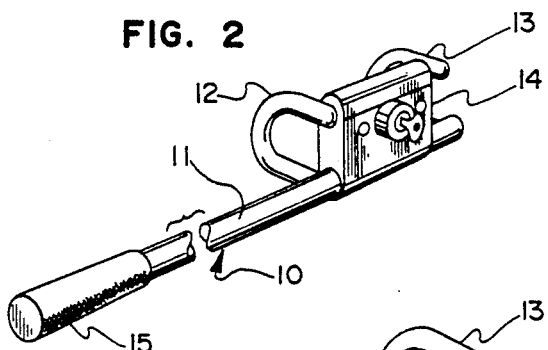
FIG. 2 is a perspective view of the lock apparatus, showing the lock assembly in a locked position.

Turning now to the drawings, FIGS. 1 and 2 illustrate the lock apparatus of the present invention at 10. The apparatus 10 generally includes an elongate member 11, a pair of hook members 12 and 13, a locking assembly 14 and a resilient member 15. The elongate member 11 is a round, solid and straight bar made of metal (e.g., steel) or any other material of high strength and rigidity.

The hook members 12 and 13 are also round bars made of metal such as steel or any other material of high strength and rigidity. They have a U-shaped configuration and they lie at a first end of the elongate member 11, spaced a predetermined distance apart and fixedly secured to the elongate member. One end of each hook member 12 and 13 extends into an opening defined by the elongate member 11 to anchor the hook member to the elongate member; and a weld connection or other suitable connection fixedly secures the hook member in the position shown in FIGS. 2 and 3.

Figure 4:
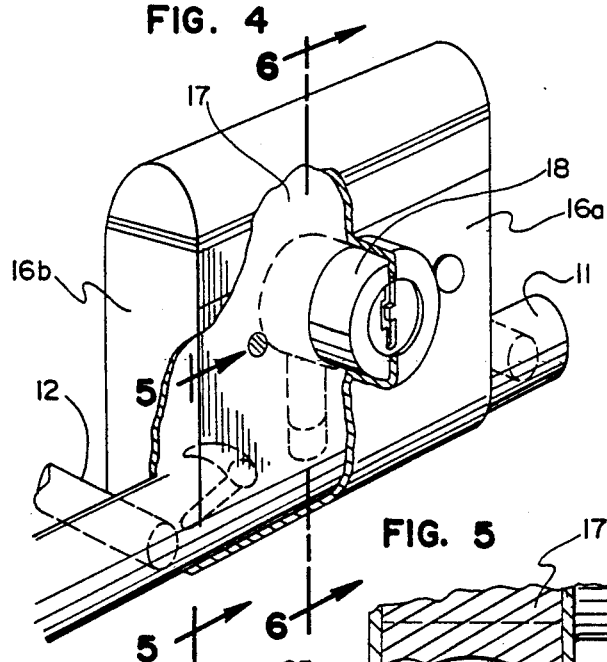
FIG. 4 is a partial perspective view of the lock apparatus, showing the lock assembly with its housing partially cut away.
Figure 6:
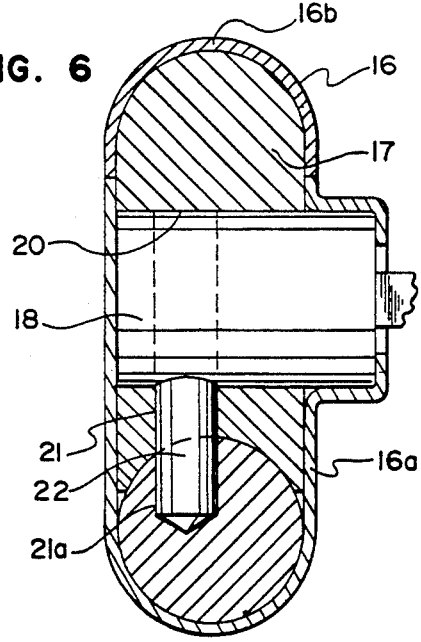
FIG. 6 is a cross-sectional view taken along line 6—6 in FIG. 4.
Figure 5:
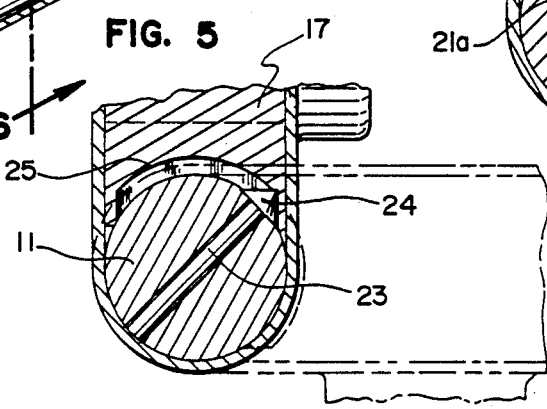
FIG. 5 is a cross-sectional view taken along line 5—5 in FIG. 4.

The locking assembly 14 cooperates with the hook members 12 and 13 to releasably secure the first end of the lock apparatus 10 to a steering wheel S as shown in FIG. 1. This assembly 14 lies between the hook members 12 and 13, pivotally mounted to the elongate member 11. Generally, it includes a housing 16 made of steel sheet metal or other suitable material of high strength and rigidity, a block member 17 made of a strong and rigid material such as aluminum and a conventional bolt lock 18 (See FIGS. 4-6).

The housing 16 contains the block member 17 and the bolt lock 18. It is a two-piece shell including a generally U-shaped main piece 16a and a cap piece 16b. It defines a first, round opening 19 and a second, round opening (not shown) through which the elongate member 11 extends in sliding engagement with those portions of the housing disposed around the openings. One of its ends has a rounded configuration and extends around the elongate member 11. The housing 16 and its contents pivot about the elongate member 11 between locking and release positions as described below.

The housing 16 defines a chamber; and the block member 17 and the elongate member 11 fill this chamber. The block member 17 protects the bolt lock 18 and adds structural integrity to the locking assembly 14. It has a rounded, concave end which, along with the rounded bottom of the housing 16, defines a bore having a diameter slightly larger than the diameter of the elongate member 11. The elongate member 11 extends through this bore.

The block member 17 defines an opening 20 which contains the bolt lock 18 and an opening 21 sized to allow reciprocating movement of a bolt or pin 22 of the bolt lock 18. When the lock assembly 14 lies in the "locking" position shown in FIGS. 2 and 4, the opening 21 registers with an opening 21a in the elongate member 11. Activation of the lock 18 allows the bolt 22 to extend into this opening 21a and secure the lock assembly 14 in a locked position.

A stop 23 (See FIG. 5) extends into an opening in the elongate member 11 and includes a knob portion 24. This knob portion 24 extends outwardly of the elongate member 11 and into a groove 25 defined by the block member 16. It cooperates with opposite ends of the groove 25 to limit the locking assembly's rotation to approximately 90°, between the positions shown in FIGS. 2 and 3. It also prevents sliding movement of the locking assembly 14, longitudinally of the elongate member 11, so that the assembly does not contact the hook members 12 and 13.

The resilient member 15 is made of synthetic rubber or any other suitable resilient material, and it covers the end of the elongate member opposite the end with the hooks 12 and 13 and locking assembly 14. This resilient member functions as a handle for the apparatus 10 and as a cushioning member which engages the inside of the automobile and avoids any damage that the elongate member may cause to the automobile.

The assembly of the lock apparatus 10 includes anchoring the hook members 12 and 13 to the elongate member 11 and welding or otherwise fixedly securing them in place. It also includes placing the block member 17, lock 18, and stop 23 in place. The next step of the assembly process includes bending the main piece 16a of the housing around the elongate member and fixedly securing it to the block member 17. Finally, the assembly includes placement of the cap portion 16b of the housing 16 and fixedly securing it to the block member 17.

Figure 3:
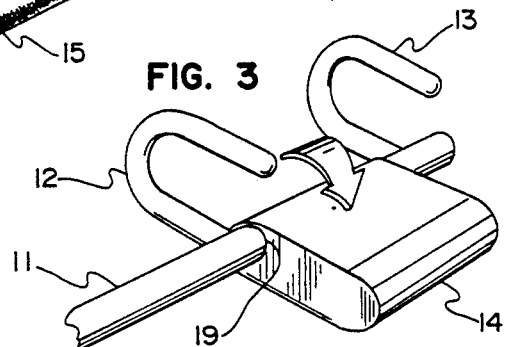
FIG. 3 is a partial perspective view of the lock apparatus, showing the lock assembly in an unlocked position.

To install the apparatus in a vehicle, a user first places the lock assembly 14 in the position shown in FIG. 3. He or she then places the apparatus 11 in the location shown in FIG. 1 proximate the steering wheel S and moves the hook members 12 and 13 around the steering wheel. In this position, one of the spokes which extends between the hub and the rim portion of a steering wheel S extends between the hook members 12 and 13 and prevents movement of the apparatus 11 around the rim portion. The user then moves the locking assembly 14 in the position shown in FIGS. 2 and 4 and engages the bolt to secure the assembly 14 in that position.

While the above description and the drawings disclose and illustrate one embodiment, one should understand, of course, that the invention is not limited to this embodiment. Those skilled in the art to which the invention pertains may make modifications and other embodiments employing the principles of this invention, particularly upon considering the foregoing teachings. The applicant intends to cover any such modifications which incorporate those features which constitute the essential features of this invention.

What is claimed is:

1. A lock apparatus for locking the steering wheel of a vehicle and limiting its rotation, said apparatus comprising: an elongate member; hook means fixedly secured to the elongate member for extending around a portion of the steering wheel of an automobile, said hook means extending transversely of the elongate member; locking means for cooperating with the hook means to secure the elongate member to the steering wheel, said locking means being pivotally mounted on the elongate member and being movable to a first position where it cooperates with a hook means and away from the first position to release the steering wheel, the axis of rotation of the locking means being disposed longitudinally of the elongate member.

2. The apparatus of claim 1 wherein the hook means includes a pair of separate hook members disposed a predetermined distance apart.

3. The apparatus of claim 2, wherein the hook members are rod segments with a generally U-shaped configuration.

4. The apparatus of claim 1, wherein the locking means includes a bolt member and the elongate member defines a corresponding opening, the bolt member selectively extending into the opening to prevent pivotal movement of the locking means.

5. The apparatus of claim 4, wherein the locking means includes a housing which defines a pair of openings through which the elongate member extends.

6. The apparatus of claim 1, wherein the hook means and the locking means lie at one end of the elongate member.

7. The apparatus of claim 6, further comprising a resilient member disposed at the opposite end of the elongate member.

8. A lock apparatus for locking the steering wheel of a vehicle and limiting its rotation, said apparatus comprising: an elongate member; hook means fixedly secured to the elongate member for extending around a portion of the steering wheel of an automobile; locking means for cooperating with the hook means to secure the elongate member to the steering wheel, said locking means being pivotally mounted on the elongate member and being movable to a first position where it cooperates with a hook means and away from the first position to release the steering wheel; and stop means for limiting the pivotal movement of the locking means between the first position and a second, predetermined position.

9. The apparatus of claim 8, wherein the stop means limits the movement of the locking means to approximately 90° of rotation.

* * * * *